US007574669B1

(12) United States Patent
Braun et al.

(10) Patent No.: US 7,574,669 B1
(45) Date of Patent: Aug. 11, 2009

(54) USER INTERFACE CONTROL FOR NAVIGATING, SELECTING, AND ORGANIZING DOCUMENT PAGES

(75) Inventors: Owen C. Braun, Seattle, WA (US); Christopher H. Pratley, Seattle, WA (US); Peter L. Engrav, Seattle, WA (US); Stuart J. Stuple, Carnation, WA (US); Jeffrey T. Krauss, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 668 days.

(21) Appl. No.: 10/266,414

(22) Filed: Oct. 8, 2002

(51) Int. Cl.
*G06F 3/048* (2006.01)
(52) U.S. Cl. .................. 715/777; 715/776; 715/786; 715/787; 715/856; 715/862
(58) Field of Classification Search ............. 715/776, 715/777, 786, 787, 856, 862, 715
See application file for complete search history.

(56) References Cited

U.S. PATENT DOCUMENTS

| | | | | |
|---|---|---|---|---|
| 5,001,697 | A | | 3/1991 | Torres .................... 364/521 |
| 5,283,864 | A | * | 2/1994 | Knowlton ................. 715/776 |
| 5,438,662 | A | * | 8/1995 | Randall ................... 715/776 |
| 5,515,497 | A | * | 5/1996 | Itri et al. ................. 715/776 |
| 5,559,946 | A | * | 9/1996 | Porter .................... 715/781 |
| 5,611,060 | A | | 3/1997 | Belfiore et al. ............ 395/341 |
| 5,745,716 | A | * | 4/1998 | Tchao et al. .............. 715/777 |
| 5,838,320 | A | | 11/1998 | Matthews III et al. ....... 345/341 |
| 5,870,092 | A | * | 2/1999 | Bedford-Roberts ......... 715/776 |
| 5,877,758 | A | | 3/1999 | Seybold .................. 345/339 |
| 6,002,398 | A | * | 12/1999 | Wilson ................... 715/777 |
| 6,282,551 | B1 | * | 8/2001 | Anderson et al. ........... 715/503 |
| 6,590,595 | B1 | * | 7/2003 | Wagner et al. ............. 715/784 |
| 6,606,101 | B1 | * | 8/2003 | Malamud et al. ........... 715/715 |

(Continued)

OTHER PUBLICATIONS

"The Java Developers Almanac 1.4", Aug. 12, 2002, Addison-Wesley, vol. 1, http://web.archive.org/web/20020812075349/http://www.javaalmanac.com/egs/javax.swing/tabbed_TpTooltip.html.*

(Continued)

*Primary Examiner*—Tadesse Hailu
*Assistant Examiner*—Alvin H Tan
(74) *Attorney, Agent, or Firm*—Merchant & Gould (57) ABSTRACT

A user interface control is provided for navigating, selecting, and organizing document pages. The user interface control includes page tabs corresponding to document pages within an electronic document. The page tabs are organized and displayed adjacent to one another in a horizontal or vertical column. When any page tab is selected, such as with a mouse or keyboard, the document page corresponding to the selected page tab is displayed. A first page tab may be selected and a second page tab may be subsequently selected, such as for instance using a mouse or other pointing device. The selection may include dragging a mouse cursor from the first page tab across several page tabs and subsequently to the second page tab. When such a selection is received, the control displays the contents of each of the document pages corresponding to page tabs between the first and second page tabs. The user interface control may also include next page tabs displayed at either end of the column of page tabs or a new page tab displayed at either end of the column of page tabs. Page tabs may also be selected and moved to a new position between other page tabs.

19 Claims, 9 Drawing Sheets

U.S. PATENT DOCUMENTS

| | | | |
|---|---|---|---|
| 6,691,138 B1* | 2/2004 | Kirkpatrick et al. | 707/204 |
| 6,741,268 B1* | 5/2004 | Hayakawa | 715/777 |
| 6,788,318 B2* | 9/2004 | Chen | 715/777 |
| 6,924,822 B2* | 8/2005 | Card et al. | 345/660 |
| 7,089,237 B2* | 8/2006 | Turnbull et al. | 707/5 |
| 7,100,133 B1* | 8/2006 | Meiyappan et al. | 716/5 |
| 7,124,373 B1* | 10/2006 | Patil | 715/779 |
| 7,266,768 B2* | 9/2007 | Ferlitsch et al. | 715/273 |
| 2004/0030719 A1* | 2/2004 | Wei | 707/104.1 |

OTHER PUBLICATIONS

Farkas, "The role of balloon help", May 1993, ACM Press, ACM SIGDOC Asterisk Journal of Computer Documentation vol. 17, Issue 2, pp. 3-19.*

Webopedia, "database", Oct. 1, 2002, Jupitermedia Corporation, http://web.archive.org/web/20021001071732/http://www.webopedia.com/TERM/d/database.html.*

IBM Technical Disclosure Bulletin, "Notebook Tabs as Source Location for Drag/Drop Operations", Dec. 1, 1992, IBM Corporation, NN9212196, vol. 35, issue 7, p. 196.*

Masui, T., Kashiwagi, K., Borden, IV, G.R., "Elastic Graphical Interfaces for Precise Data Manipulation," Software Research Laboratories, SHARP Corporation, Proceedings of the Conference on Human Factors in Computing Systems, Part 2 of 2, 1995, p. 143-144.

Anantharaman, V., "Windows 95 Common Controls," Dr. Dobb's Journal of Software Tools for Professional Programmer, V. 20, No. 5, May 1995, p. 52-63.

Helfman, J.I., "Panther: A Specification System for Graphical Controls," AT&T Bell Laboratories, Murray Hill, New Jersey, CHI & GI 1987 Conference Proceedings: Human Factors in Computing Systems and Graphics Interface, 1987, p. 279-284.

Kaptelinin, V., "A Comparison of Four Navigation Techniques In A 2D Browsing Task," Department of Informatics, UmeCE University, Proceedings of the Conference on Human Factors in Computer Systems, Part 2 of 2, 1995, p. 282-283.

* cited by examiner

USER INTERFACE CONTROL FOR NAVIGATING, SELECTING, AND ORGANIZING DOCUMENT PAGES

TECHNICAL FIELD

The invention generally relates to the field of electronic document processing and, more specifically, to the field of user interface controls for navigating among the pages of an electronic document.

BACKGROUND OF THE INVENTION

For many individuals, the act of taking notes is a very kinesthetic process. The physical location of notes on a page or within a notebook conveys a considerable amount of meaning to the note taker. Moreover, the physical act of thumbing through the pages of a notebook, also called riffling, to locate a particular page is very important. Note takers typically riffle through a notebook to identify the approximate location of a desired page and then locate the desired page by flipping individual pages. In this manner, riffling allows a note taker to quickly locate desired information within a notebook.

Despite the considerable speed at which a particular page can be located in a notebook by riffling, there is no parallel to riffling available for use within a graphical user interface. Current user interface controls for navigating between pages of a document do not provide the benefits of riffling through a notebook in a conventional fashion. For instance, traditional continuous navigation controls, like scroll bars, are awkward to use with large streams of data because they provide no quantum, or smallest unit of place, to navigate to. Continuous navigation controls make it very difficult, therefore, to locate a single page among a large number of pages in an electronic document.

Discrete navigation controls, such as tab controls, do provide a very strong sense of place and the ability to easily locate a smallest unit of place, such as a single page. However, discrete navigation controls do not provide the ability to skim comfortably through the pages as a stream, in a manner similar to riffling.

Therefore, in light of the above, there is a need for an improved user interface control that allows a user to more easily navigate to pages within an electronic document by providing the ability to comfortably riffle, or skim, through the pages of a document as a stream. Moreover, there is a need for an improved user interface control that allows a user to more easily select a single page from a large number of pages while retaining the ability to riffle quickly through the pages of an electronic document.

SUMMARY OF THE INVENTION

The present invention solves the above-described problems by providing an improved user interface control that allows a user to more easily navigate among pages in an electronic document in a manner similar to riffling through the contents of a notebook. Moreover, the user interface control provided herein allows a user to easily and quickly locate a particular page among a large number of pages, to select and view pages, and to easily reorder and otherwise organize the document pages.

Generally described, a user interface control is provided herein that includes page tabs corresponding to document pages within an electronic document. The page tabs are organized and displayed adjacent to one another in a horizontal or vertical column. When any page tab is selected, such as with a mouse or keyboard, the document page, or pages, corresponding to the selected page tab is displayed. The selected page tab may also display a page number or other information.

The user interface control provided herein also provides functionality for riffling among the document pages. In particular, a first page tab may be selected and a second page tab may be subsequently selected, such as for instance using a mouse or other pointing device. The selection may include dragging a mouse cursor from the first page tab across several page tabs and subsequently to the second page tab. When such a selection is received, the control displays the contents of each of the document pages corresponding to page tabs between the first and second page tabs. In this manner, each of the document pages between two pages tabs can be quickly viewed while retaining the ability to easily stop at any one page tab.

The user interface control provided herein may also include next page tabs displayed at either end of the column of page tabs. When selected, the next page tabs cause the document page associated with either the next or previous page tab to be displayed and the page tab to be selected as the current page tab. The next page tabs may only be displayed if the total number of page tabs corresponding to document pages exceeds the number of page tabs that may be simultaneously displayed within a viewable area of an application window hosting the control. In this manner, the next page tabs may be utilized to scroll the column of page tabs to view page tabs that are off screen.

A new page tab may also be displayed at either end of the column of page tabs. When selected, the new page tab causes a new document page to be created in the electronic document. Moreover, selection of the new page tab causes a page tab to be created corresponding to the new document page. In this manner, the new page tab allows new pages to be quickly and easily added to the electronic document. Page tabs in the user interface control provided herein may be initially created and shown in a chronological order. Page tabs may also be selected and moved to a new position between other page tabs. In this manner, the page tabs may be reorganized easily from the position at which they were originally created.

Embodiments of the present invention also provide a method and computer-readable medium for navigating, selecting, and reorganizing document pages. Additional details regarding various aspects of the present invention will become apparent from the detailed description of the invention that follows.

BRIEF DESCRIPTION OF THE DRAWINGS

FIGS. 2-9C are screen diagrams showing illustrative screen displays provided by various embodiments of the invention;

DETAILED DESCRIPTION

As described briefly above, embodiments of the present invention provide a user interface control, methods, and computer-readable media for navigating, selecting, and reorganizing document pages. In the following detailed description, references are made to the accompanying drawings that form a part hereof, and in which are shown by way of illustration specific embodiments or examples. These embodiments may be combined, other embodiments may be utilized, and structural changes may be made without departing from the spirit and scope of the present invention. The following detailed description is, therefore, not be taken in a limiting sense, and the scope of the present invention is defined by the appended claims and their equivalents.

Figure 1:
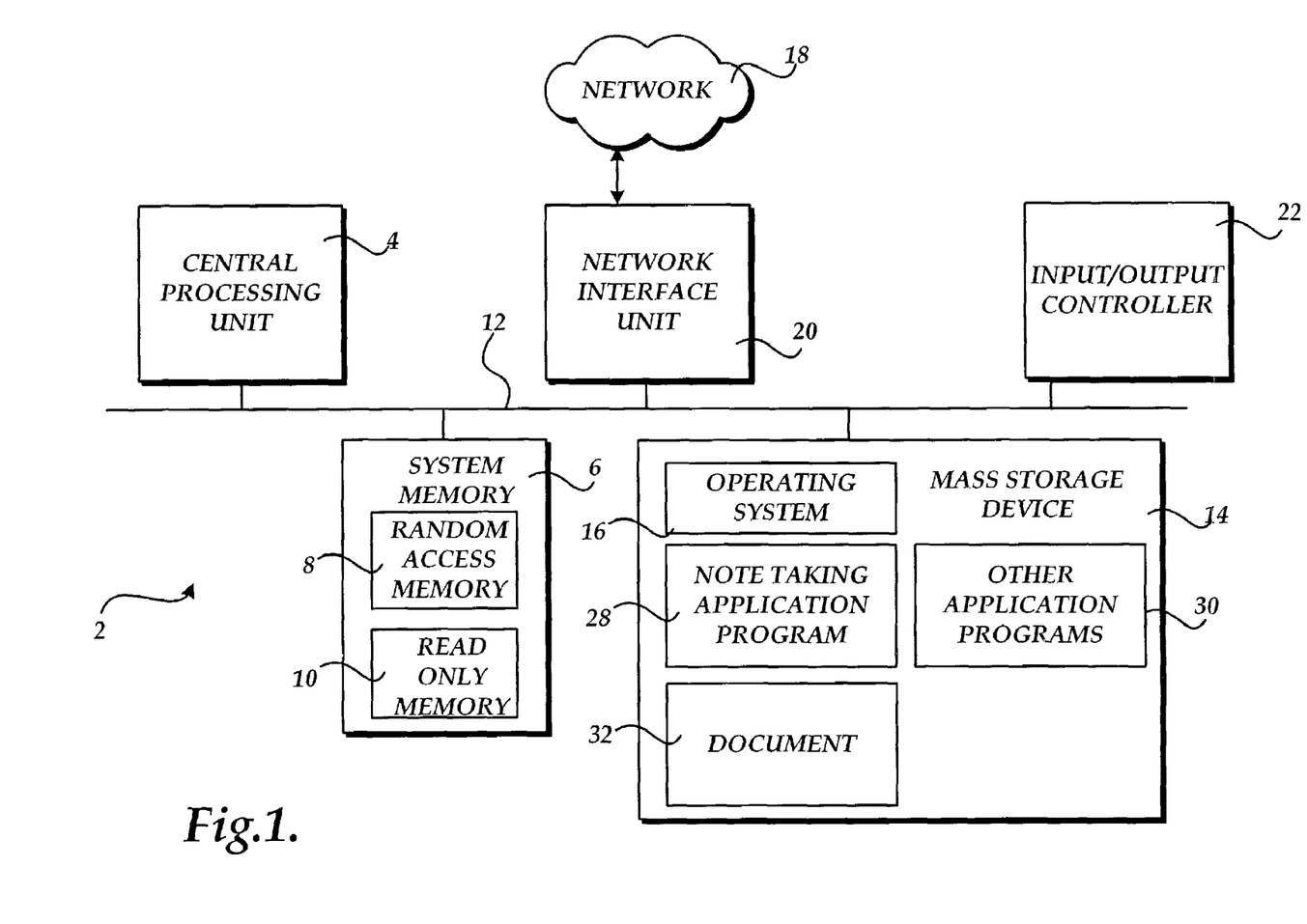
FIG. 1 is a block diagram showing an illustrative computer architecture for a computer utilized by the various embodiments of the invention.

Referring now to the drawings, in which like numerals represent like elements through the several figures, aspects of the present invention and the exemplary operating environment will be described. FIG. 1 and the following discussion are intended to provide a brief, general description of a suitable computing environment in which the invention may be implemented. While the invention will be described in the general context of program modules that execute in conjunction with an application program that runs on an operating system on a personal computer, those skilled in the art will recognize that the invention may also be implemented in combination with other program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Turning now to FIG. 1, an illustrative computer architecture for a personal computer 2 for practicing the various embodiments of the invention will be described. The computer architecture shown in FIG. 1 illustrates a conventional personal computer, including a central processing unit 4 ("CPU"), a system memory 6, including a random access memory 8 ("RAM") and a read-only memory ("ROM") 10, and a system bus 12 that couples the memory to the CPU 4. A basic input/output system containing the basic routines that help to transfer information between elements within the computer, such as during startup, is stored in the ROM 10. The personal computer 2 further includes a mass storage device 14 for storing an operating system 16, application programs, such as the note taking application program 28, and data.

The mass storage device 14 is connected to the CPU 4 through a mass storage controller (not shown) connected to the bus 12. The mass storage device 14 and its associated computer-readable media, provide non-volatile storage for the personal computer 2. Although the description of computer-readable media contained herein refers to a mass storage device, such as a hard disk or CD-ROM drive, it should be appreciated by those skilled in the art that computer-readable media can be any available media that can be accessed by the personal computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

According to various embodiments of the invention, the personal computer 2 may operate in a networked environment using logical connections to remote computers through a network 18, such as the Internet. The personal computer 2 may connect to the network 18 through a network interface unit 20 connected to the bus 12. It should be appreciated that the network interface unit 20 may also be utilized to connect to other types of networks and remote computer systems. The personal computer 2 may also include an input/output controller 22 for receiving and processing input from a number of devices, including a keyboard, mouse, or electronic stylus (not shown in FIG. 1). Similarly, an input/output controller 22 may provide output to a display screen, a printer, or other type of output device.

As mentioned briefly above, a number of program modules and data files may be stored in the mass storage device 14 and RAM 8 of the personal computer 2, including an operating system 16 suitable for controlling the operation of a networked personal computer, such as the WINDOWS XP operating system from MICROSOFT CORPORATION of Redmond, Wash. The mass storage device 14 and RAM 8 may also store one or more application programs. In particular, the mass storage device 14 and RAM 8 may store a note taking application program 28 for creating and editing an electronic document 32 containing typewritten notes or notes written with an electronic stylus. Although the embodiments of the invention described herein are described in the context of a note taking application program 28, the embodiments of the invention may also be used similarly with a word processing application program, a spreadsheet application program, or other application programs for creating and editing other types of electronic documents. Additional details regarding the operation of the note taking application program 28 will be described in greater detail below.

Figure 2:
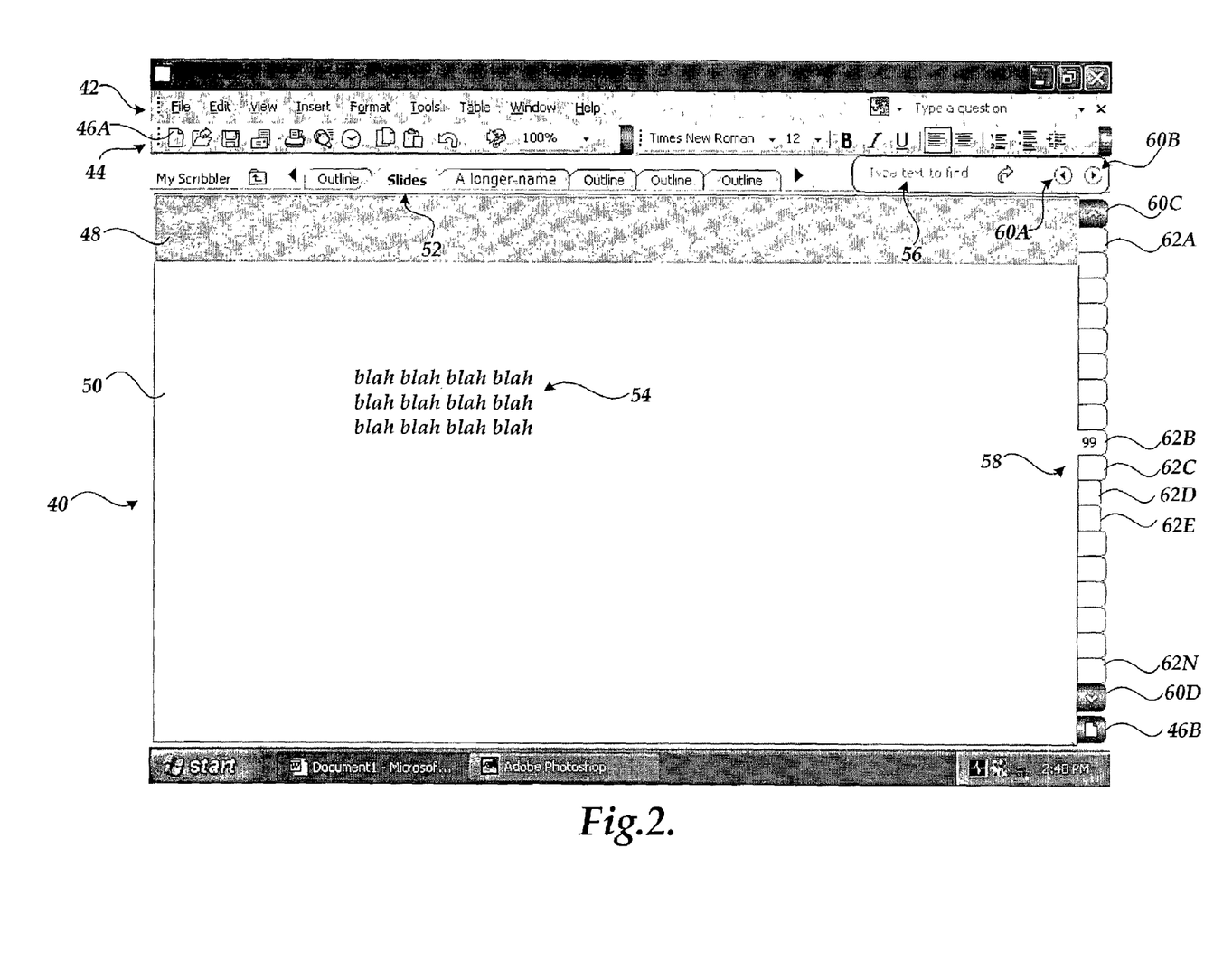

Referring now to FIG. 2, additional aspects regarding the operation of the note taking application program 28 will be described. As mentioned briefly above, the note taking application program 28 provides a two-dimensional freeform surface for recording typewritten or pen written notes. To provide this functionality, the note taking application program 28 generates an application window 40. As shown in the application window 40, a number of conventional tools are provided for creating and editing typewritten or pen written notes. In particular, a menu 42 is provided allowing a user easy access to various tools through keystroke combinations or through mouse selection. Additionally, a toolbar 44 is provided that allows a user to select the various tools through an iconic interface. Zoom levels, fonts, and font sizes may also be similarly selected using visual elements. A search box 56 is also provided that allows easy searching of the contents of electronic documents open in the application window 40.

According to the various embodiments of the invention, the electronic document 32 utilized by the note taking application program 28 includes a body area 50 and a title area 48. The body area 50 is a freeform surface in which textural or pen written notes may be generated and recorded by a user. It should be appreciated that the size of the body area 50 is not limited to the viewable portion shown in the application window 40 and that the size of the body area 50 may be extended indefinitely in any direction. In order to view the entire area of the electronic document 32, the viewable area within the application window 40 may be scrolled. The contents of the title area 48 are continuously displayed regardless of the scroll position of the body area 50.

In order to navigate between multiple open documents 32, the application window 40 also includes one or more notebook tabs 52. As shown in FIG. 2, the document 32 having a notebook tab 52 entitled "Slides" is selected. Through the use of the notebook tabs 52, a user may easily select other documents 32 open in the application window 40. It should be appreciated that each notebook tab 52 represents an electronic document 32 that may include multiple document pages. A user interface control for navigating among the pages will be described in greater detail below.

In order to generate notes within the body area 50, a user may place an insertion point at the position at which they would like to generate notes. The user may then type the text 54 at the position of the insertion point. As the user types, the insertion point is moved to reflect the typed characters in a conventional manner. According to one embodiment of the invention, the text 54 is maintained within an outline object. In this manner, the text 54 typed by the user may be maintained in an organized fashion.

Figure 9A:
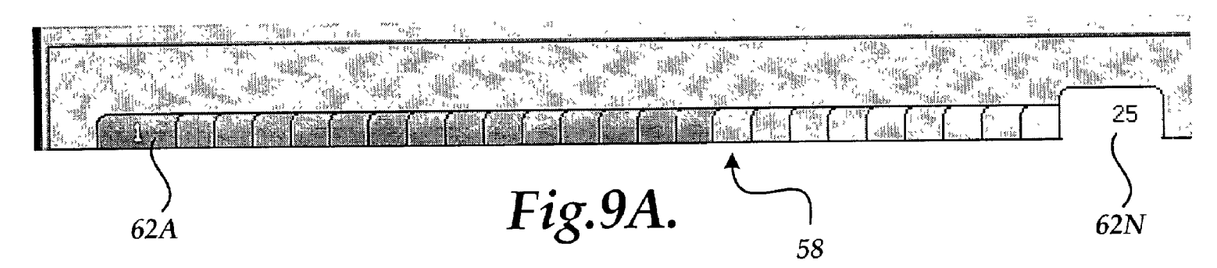
Figure 9B:
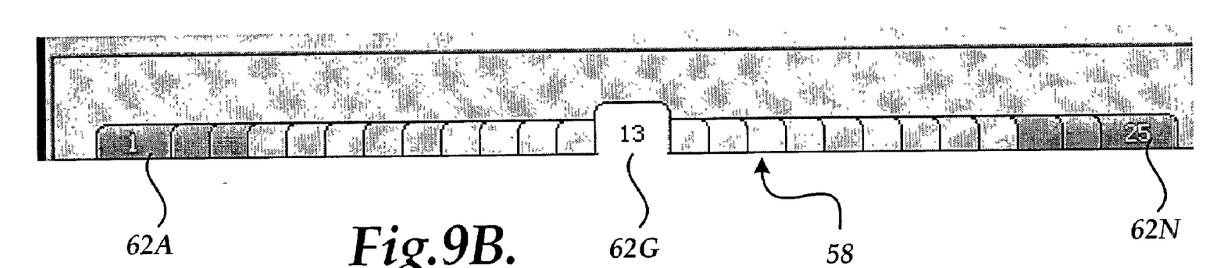
Figure 9C:
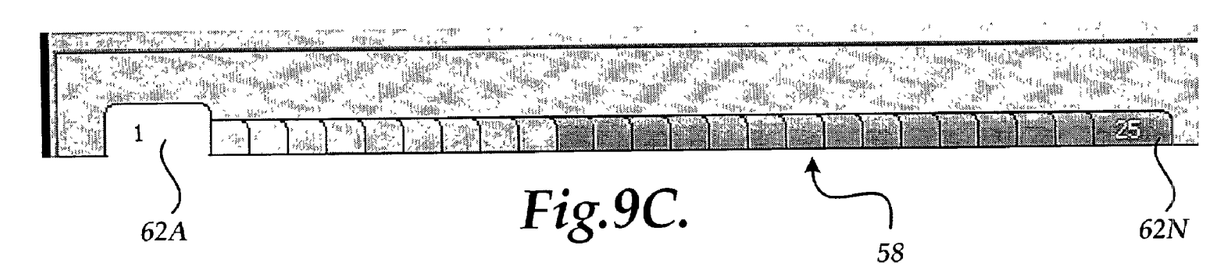

As shown in FIG. 2, a user interface control 58 is also provided for navigating, selecting, and organizing pages of the electronic document 32. In particular, the user interface control 58 includes one or more page tabs 62A-62N. Each of the page tabs 62A-62N corresponds to one or more pages of the electronic document 32. As shown in FIG. 2, the page tabs 62A-62N are displayed adjacent to one another and may be displayed in a vertical column as shown in FIG. 2 or in a horizontal column as shown in FIGS. 9A-9C. It should be appreciated that each page tab 62A-62N may be associated with a document that contains more than one page. A scroll bar may be provided to navigate among the various pages of the document selected by one of the page tabs 62A-62N.

The user interface control 58 may be utilized to select various pages of the electronic document 32. In particular, the page tabs 62A-62N may be selected utilizing a mouse, keyboard or other type of input device. In response to being selected, the document page, or pages, corresponding to the selected page tab is displayed. For instance, as shown in FIG. 2, the document page 99 is displayed in response to the selection of the page tab 62B.

As shown in FIG. 2, the user interface control 58 may also include next page tabs 60C and 60D. The next page tabs 60C and 60D may be displayed at either end of the horizontal or vertical column of page tabs. Each of the next page tabs 60C and 60D causes a page tab adjacent to the current selected page tab to become the new selected page tab. The document page corresponding to the new selected page tab is then displayed in the body area 50.

According to one embodiment, the new page tab 60C is utilized to display a document page previous to the currently selected page tab and the next page 60D is utilized to select a page tab subsequent to the currently selected page tab. Moreover, the next page tab 60C and 60D may be utilized to scroll the column of page tabs to display page tabs that would otherwise be undisplayable within the viewable area of the application window 40. In this manner, any number of document pages may be represented utilizing the page tabs 62A-62N and the next page tab 60C and 60D.

According to one embodiment of the invention, the next page tab 60C and 60D are displayed only if the number of page tabs 62A-62N exceeds the number of page tabs that may be simultaneously displayed within the viewable area of the application window 40. Next page tabs 60A and 60B may also be provided outside the area of the user interface control 58.

According to another embodiment of the invention, the next page tabs 60C and 60D may be utilized to navigate forward or backward a preset number of additional pages. For example, the preset number may be set equivalent to the number of displayed page tabs 62A-62N. In this manner, the next page tabs 60C and 60D may be utilized to navigate between groups of page tabs 62A-62N.

According to one embodiment of the invention, the user interface control 58 also includes a new page tab 46B displayed at an end of either the horizontal or vertical column of page tabs 52A-62N. The new page tab 46B is operative to create a new document page and to create a new page tab corresponding to the new document page in response to being selected. A new page button 46A may also be provided in the toolbar 44.

According to one embodiment of the invention, the user interface control 58 allows a user to easily riffle through the contents of an electronic document. In order to riffle through pages in this manner, a mouse or other pointing device may be utilized to select one of the page tabs 62A-62N. The mouse may then be dragged over a number of other page tabs 62A-62N until it rests at a second page tab. While the mouse cursor is being dragged over the intermediate page tabs, the document pages corresponding to those page tabs are displayed. In this manner, the document page corresponding to each of the page tabs 62A-62N over which the mouse cursor is dragged will be visible in the body area 50, even if for a short period of time. When the cursor comes to a rest, the page tabs 62A-62N over which the cursor rests will be displayed as the currently selected page.

As also shown in FIG. 2, page tabs 62D and 62E may be utilized to distinguish continuation pages from other types of pages. Continuation pages are those pages that continue a sequence of notes begun on a previous page. According to various embodiments of the invention, the continuation page tabs 62D and 62E may be displayed in a manner to distinguish them from other types of page tabs. In the embodiment shown in FIG. 2, the continuation page tabs 62D and 62E are displayed smaller than other page tabs. By showing the continuation page tabs 62D and 62E in a distinguishable manner, the continuation pages may be easily identified using the user interface control 58.

Figure 3A:
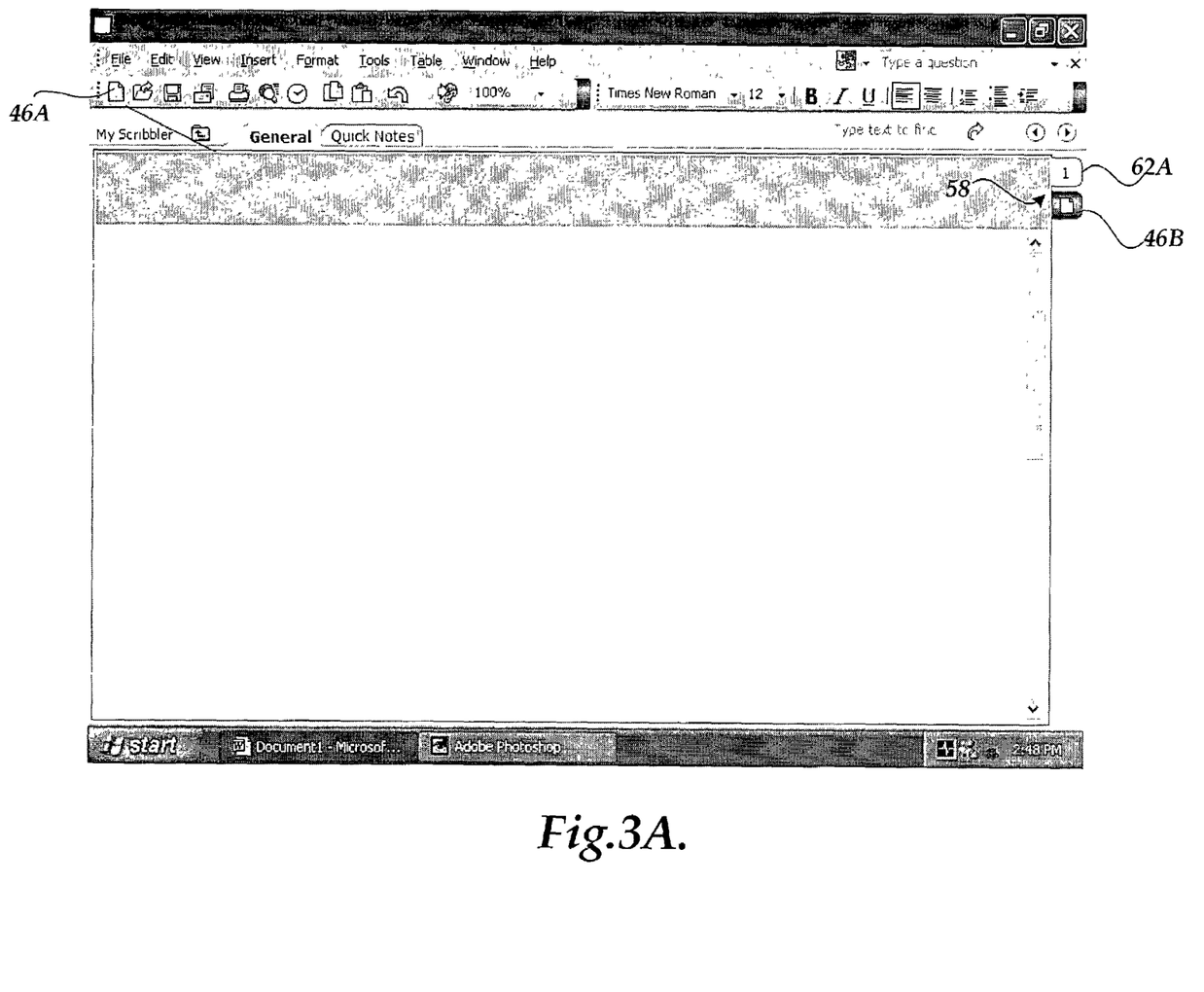
Figure 3B:
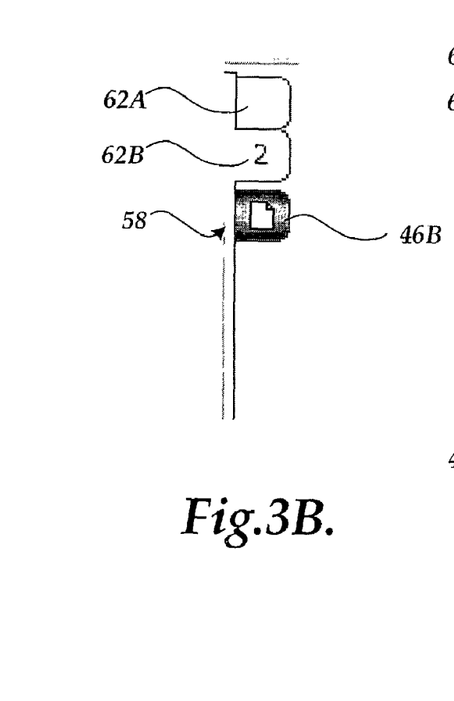

Referring now to FIGS. 3A and 3B, additional details regarding the operation of the user interface control 58 will be described. As shown in FIG. 3A, a single page tab 62A is displayed when a new document is created. As shown in FIG. 3A, the page tab 62A includes a page number displayed within the selected page tab. In this manner, a user can quickly identify the number of the selected page. The user interface control 58 also includes a new page tab 46B for creating a new page within the electronic document. The new page button 46A may also be used to create a new page in a similar manner.

If either the new page tab 46B or the new page button 46A are selected, a new page is created within the document and a new page tab 62B is created corresponding to the new page. As shown in FIG. 3B, the new page tab 62B is selected as the current page tab and the contents of the new page are shown in the body area 50. In this manner, new page tabs are created and initially displayed in a chronological order from a first created document page to a most recently created document page. As will be described in greater detail below, the page tabs 62A-62N may be easily moved and reorganized utilizing various aspects of the user interface control 58.

Figure 4:
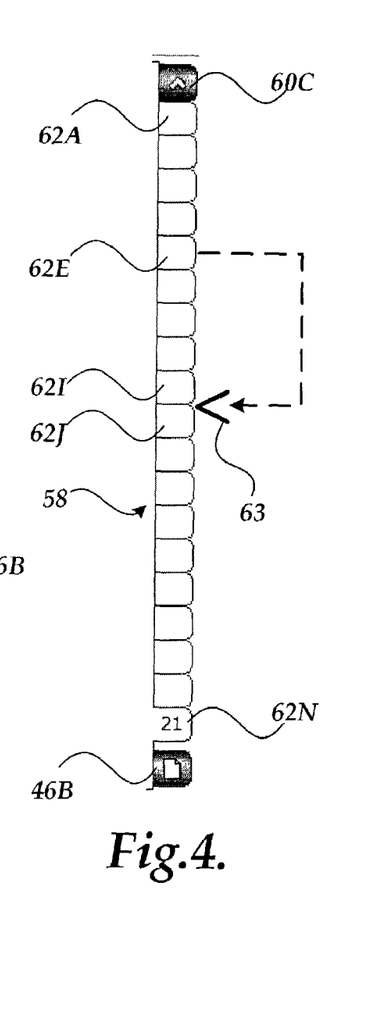

Referring now to FIG. 4, additional aspects regarding the operation of the user interface control 58 will be described. As shown in FIG. 4, one of the page tabs 62E may be selected using a mouse or other, pointing device. When selected and moved to either side of the column of page tabs, a highlighted outline of the page tab 62E may be displayed. Additionally, an insertion point 63 may be displayed between two page tabs 62I and 62J adjacent to the selected page tab 62E. As the selected page tab 62E is moved along the length of the column of page tabs, the insertion point 63 moves accordingly. In this manner, a user may easily identify where a page tab 62E will be inserted when the selection button is released. When the selection button, such as a mouse button, is released the selected page tab 62E is moved to its new position between the two page tabs 62I and 62J. In this manner, the selected page tab is relocated to its new position. It should be appreciated that the selected page tab 62E need not be the current page tab 62N in order to be relocated.

Figure 5:
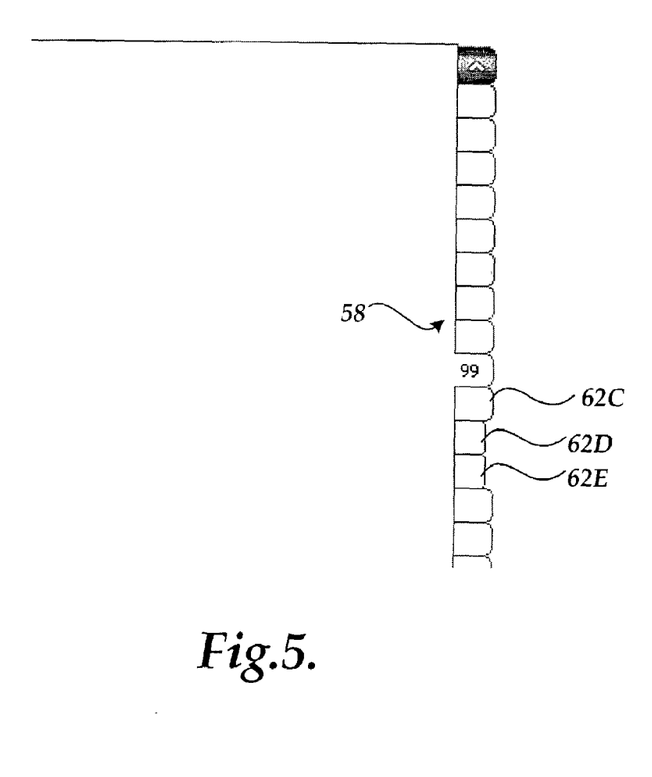

Referring now to FIG. 5, additional aspects regarding the operation of the user interface control 58 will be described. As shown in FIG. 5, the continuation page tabs 62D and 62E are displayed smaller than the page tab 62C. As described briefly above, the page tabs 62D and 62E are displayed in a manner that indicates that the document pages corresponding to the page tabs 62D and 62E are continuation pages of the document pages corresponding to the page tab 62C.

Displaying the continuation page tabs 62D and 62E in this manner allows a user to easily locate sets of document pages by their length. It should be appreciated that pages may be relocated within groups of continuation page tabs 62D and 62D in a similar manner as to that described above with respect to FIG. 4. Page tabs may be relocated to a position prior to groups of continuation page tabs, within groups of continuation page tabs, or following groups of continuation page tabs.

Figure 6:
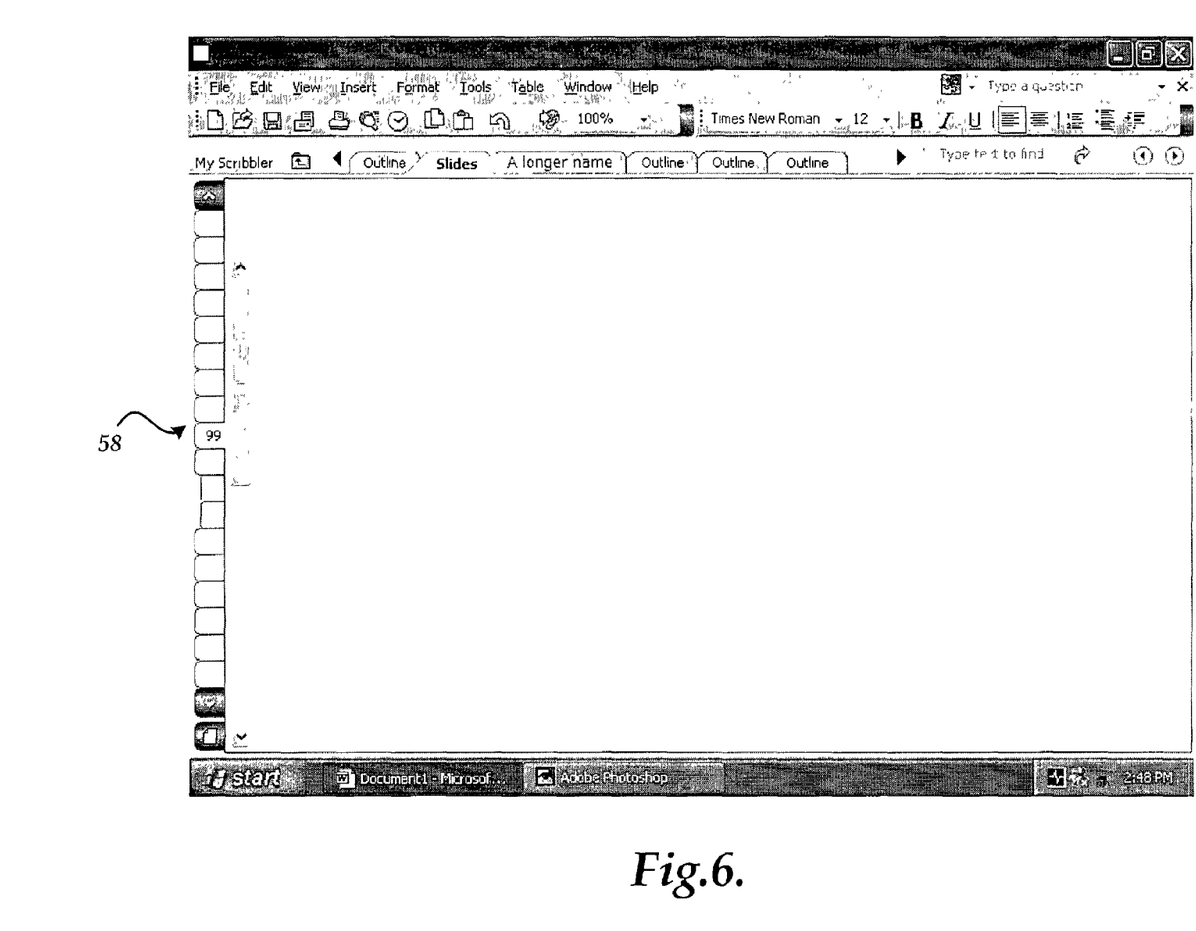
Figure 8A:
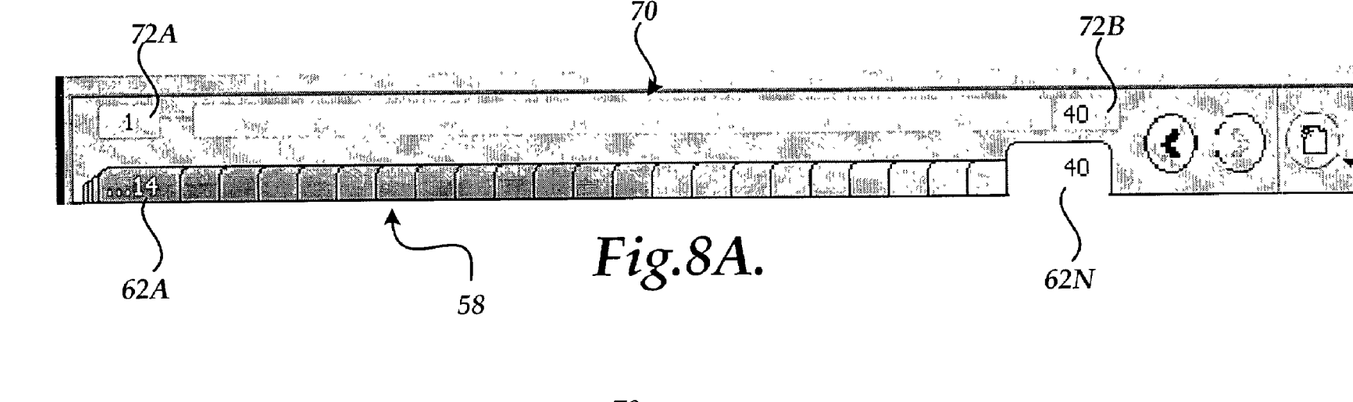
Figure 8B:
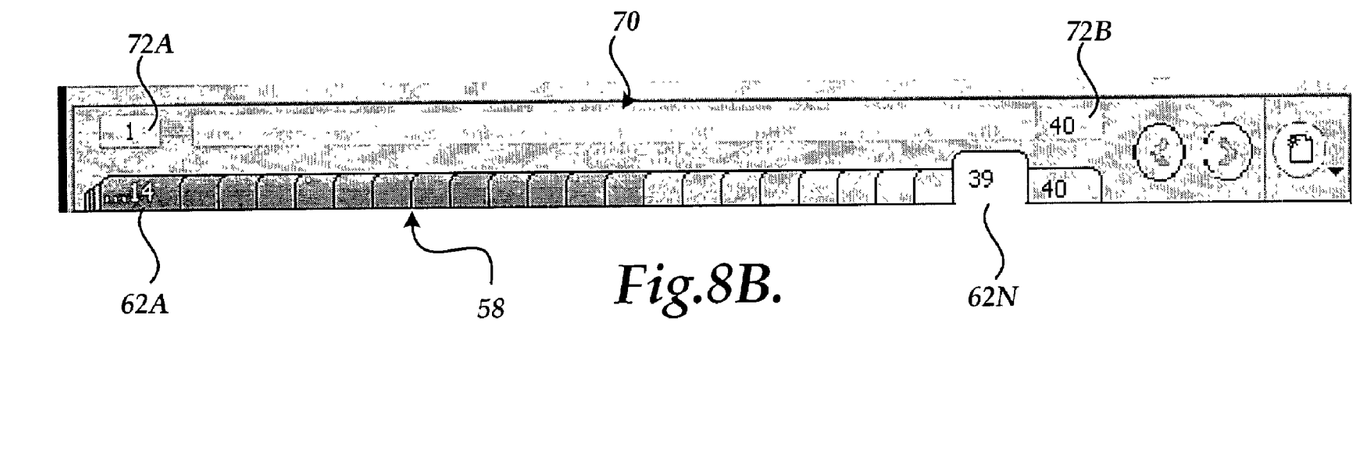

Referring now to FIG. 6, additional aspects regarding the operation of the user interface control 58 will be described. As shown in FIG. 6, the user interface control 58 may be displayed on a left side of the application window 40. As described briefly above, the user interface control 58 may also be described in the top or bottom portion of the application window 40 by displaying the page tabs in a horizontal configuration. Such a configuration is shown in FIGS. 8A and 8B. It should be appreciated that the user interface control may also be placed at other positions within the application window 40 as specified by a user, including the ability to have the user interface control 58 "float" above other controls within the application window in a manner similar to that used by convention floating toolbars. Other configurations should be apparent to those skilled in the art.

Figure 7:
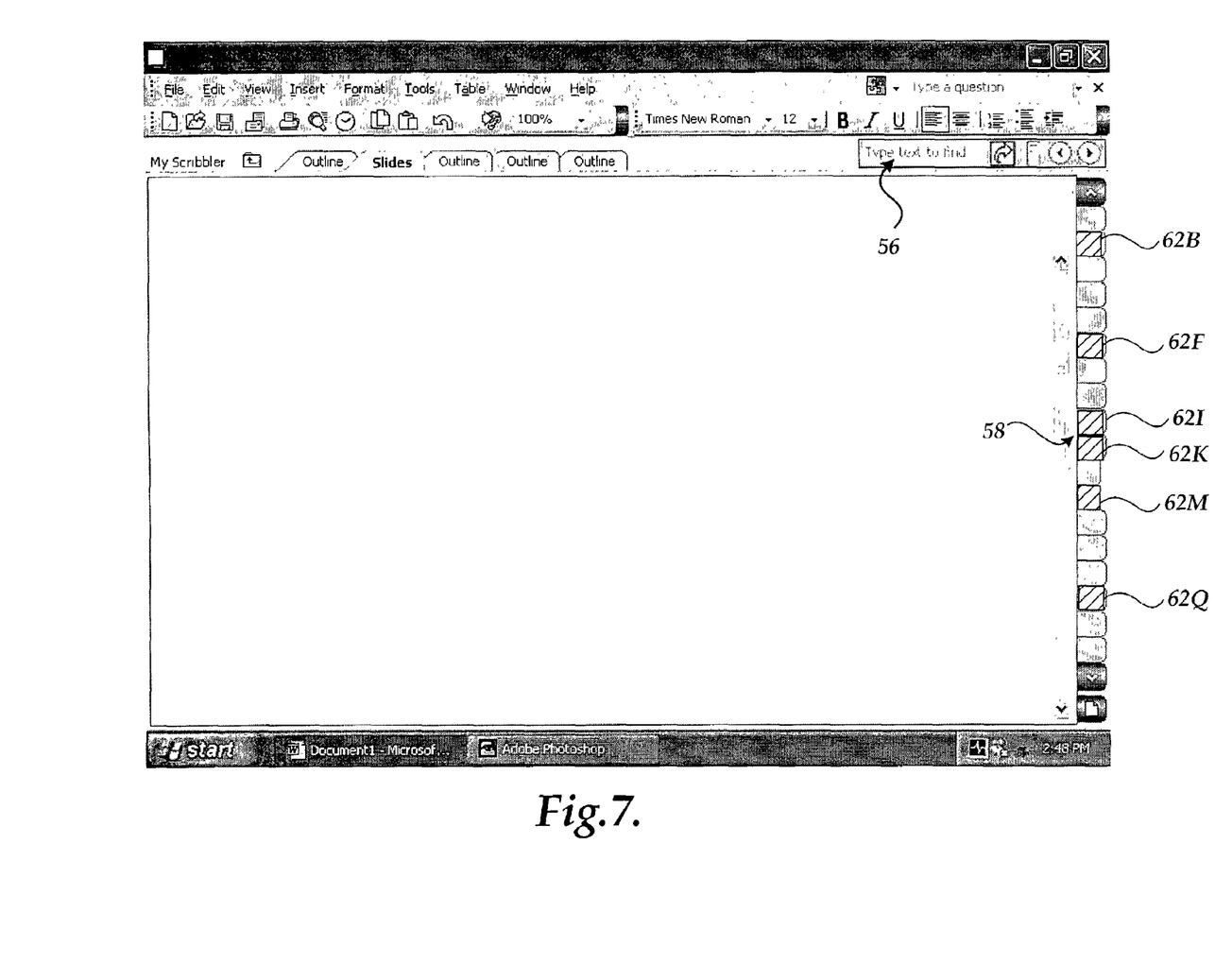

Turning now to FIG. 7, additional aspects regarding the operation of the user interface control 58 will be described. As shown in FIG. 7, page tabs 62B, 62F, 62I, 62K, 62M, and 62Q have been colored in a manner to distinguish them from other page tabs. In particular, through the use of a drop down menu or other menu, a color may be specified for any of the page tabs shown in the user interface control 58. According to various embodiments of the invention, the find control 56 may color page tabs that have contents containing user-specified search terms. Moreover, the colored page tabs may be utilized to effectively identify particular pages in a manner similar to using a conventional colored note. Additional details regarding coloration of the page tabs 62A-62N according to various other embodiments of the invention will be described below with references to FIGS. 8A-8B and 9A-9C.

Referring now to FIGS. 8A and 8B, additional details regarding the operation of the user interface control 58 provided according to one embodiment of the invention will be described. As shown in FIGS. 8A and 8B, the user interface control 58 has been oriented in a horizontal manner. Moreover, according to this embodiment of the invention, the currently selected page tab 62N is displayed in manner to distinguish it from other currently unselected page tabs. In particular, the currently selected page tab 62N is displayed larger than the other unselected page tabs. In this manner, the currently selected page tab 62N may be more easily identified by a user.

As also shown in FIGS. 8A-8B, the page tabs 62A-62N have been colored utilizing a gradient that varies from a dark shade to white. In particular, the gradient has been applied to the page tabs 62A-62N in a manner that causes the page tabs furthest away from the currently selected page tab 62N to be shaded the darkest. The currently selected page tab 62N is, by contrast, shaded the lightest. In this manner, the appearance that page tabs having a darker color are further away from the currently selected page tab 62N becomes apparent to the user. FIGS. 9A-9C provide further illustration regarding the shading of page tabs 62A-62N in this manner.

According to one embodiment of the invention, the user interface control 58 may further include a scroll bar 70. The scroll bar 70 may be displayed adjacent to a vertical or horizontal column of page tabs and be utilized to select the group of page tabs displayed within the viewable portion of the application window. For instance, as shown in FIG. 8A, a total of 40 page tabs are represented, with page tabs 14-40 being displayed. The scroll bar 70 may be utilized to select the portion of the page tabs that are displayed. Moreover, according to another embodiment of the invention, the size of the scroll bar 70 may vary adversely to the total number page tabs. In this manner, a sense of quantity may be presented through the varying size of the scroll bar 70. Moreover, fields 72A and 72B may be provided at opposing ends of the scroll bar 70 to identify the first and last document pages.

According to one embodiment of the invention, a "tool tip" may be provided when a mouse cursor "hovers" over one of the page tabs 62A-62N. The tool tip may provide information regarding the page tab over which it is hovering, such as the page number, the page title, and the creation date. In this manner, this information may be obtained for each page without having to select the page tab. Alternatively, this or other information may be presented to the user in the page tabs 62A-62N themselves. This information may be provided in a selected page tab or, in another embodiment, in all of the page tabs 62A-62N.

Figure 10:
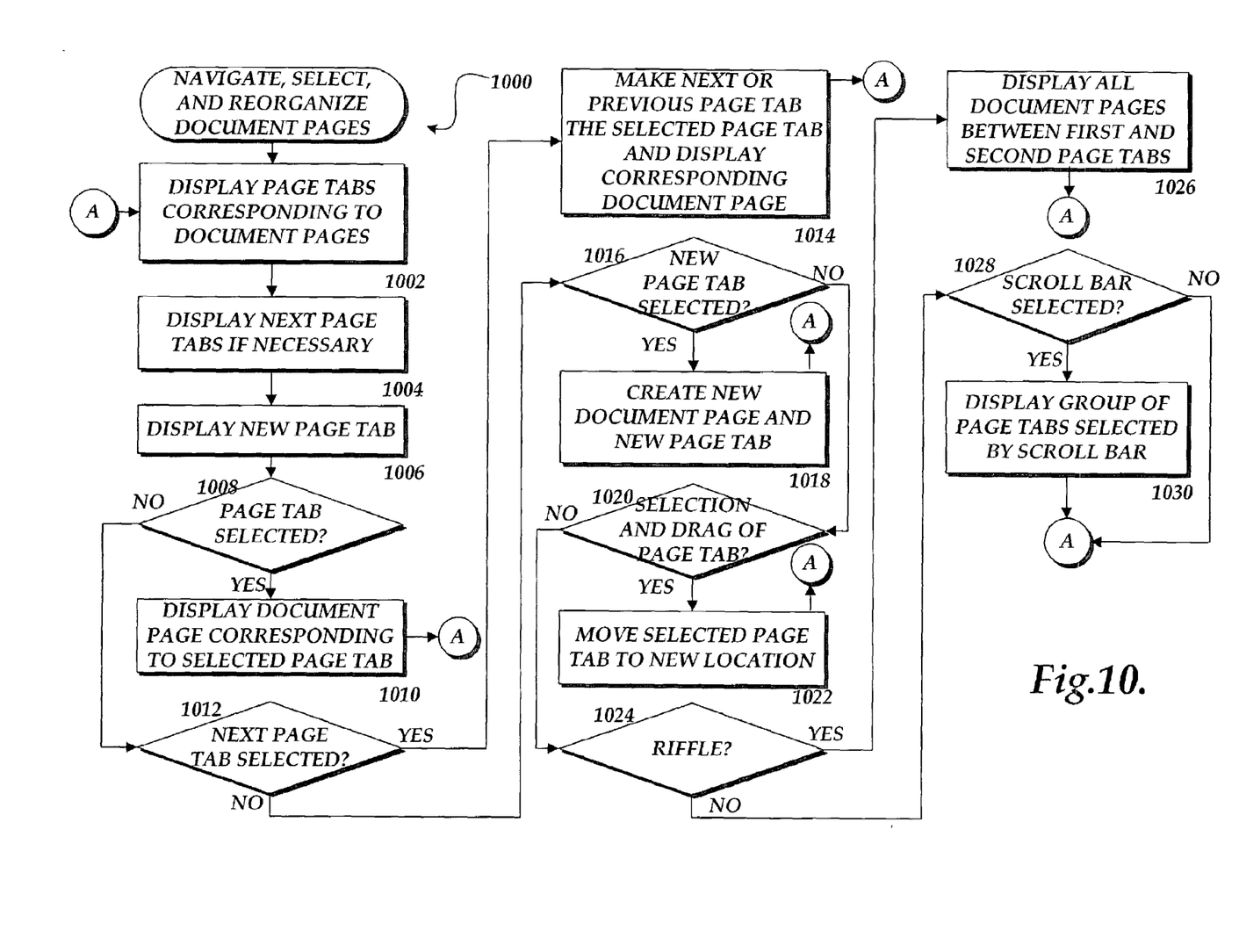
FIG. 10 is a flow diagram showing an illustrative routine for navigating, selecting, and reorganizing document pages according to one actual embodiment of the invention.

Referring now to FIG. 10, an illustrative routine 1000 will be described for navigating, selecting, and reorganizing document pages utilizing the user interface control 58. The routine 1000 begins at block 1002 where the page tabs 62A-62N are displayed for each document page contained in the currently selected document. Moreover, a page tab is displayed for the currently selected page within the document, including a number or other information. Once this information has been displayed, the routine 1000 continues from block 1002 to 1004.

At block 1004, the next page tabs 60C and 60D are displayed. As described above, these tabs may only be displayed if the number of page tabs exceeds a number of page tabs that may be simultaneously displayed within a viewable area of the application window 40. The routine 1000 then continues to block 1006, where the new page tab 46B is also displayed.

From block 1006, the routine 1000 continues to block 1008, where a determination is made as to whether a particular page tab has been selected. As described above, the selection may be made using a mouse, other type of pointing device, keyboard, or other type of input device. If a page tab has not been selected, the routine 1000 branches from 1008 to block 1012. If, however, a page tab has been selected, the routine 1000 continues to block 1010 where the document page corresponding to the selected page tab is displayed. From block 1010, the routine 1000 returns to block 1002.

At block 1012, a determination is made as to whether either of the next page tabs 60C or 60D has been selected. If a next page tab has not been selected, the routine 1000 branches to block 1016. If, however, one of the next page tabs 60C or 60D has been selected, the routine 1000 branches to block 1014. At block 1014, the next or previous page tab is made the selected page tab and the corresponding document page is displayed. In this manner, the next page tabs 60C and 60D may be utilized to select either the previous or subsequent page tab as the currently selected page tab. From block 1014, the routine 1000 returns to block 1002.

At block 1016, a determination is made as to whether the new page tab 46B has been selected. If the new page tab 46B has not been selected, the routine 1000 branches to block 1020. If, however, the new page tab 46B has been selected, the routine 1000 continues to block 1018. At block 1018, a new document page is created in the electronic document and a new page tab is created corresponding to the new document page. The new page tab is then selected as the currently selected page. In this manner, a user may easily create a new document page within the document and have that page selected as the current page ready for input. From block 1018, the routine 1000 returns to block 1002.

At block 1020, a determination is made as to whether the user has selected a page tab and dragged the page tab to a new location in an attempt to move the selected page tab. If a selection and drag in this manner was not made, the routine 1000 branches to block 1024. If, however, a selection and drag has been made, the routine 1000 continues to block 1022, where the selected page tab is moved to its new location as specified by the user. The routine 1000 then continues from block 1022 to block 1002.

At block 1024, a determination is made as to whether input has been received indicating that the user would like to riffle through the page tabs using the user interface control 58. As described above, such a request may be provided by the user by selecting a first page tab and dragging over additional page tabs until a second page tab has been reached. If such a request has not been received, the routine 1000 branches to block 1028. If, however, a request to riffle through the page tabs has been received, the routine 1000 branches from block 1024 to block 1026.

At block 1026, all of the document pages corresponding to page tabs over which the drag movement was made are displayed. If the drag movement is made to the bottom of the currently displayed column of page tabs, the currently viewable portion of page tabs scrolls up or down accordingly. In this manner, a user may riffle through document pages not identified by on-screen page tabs. From block 1026, the routine 1000 returns to block 1002.

As discussed above, according to various embodiments of the invention, the user interface control 58 may include a scroll bar 70. In such an embodiment, a determination is made at block 1028 as to whether the scroll bar has been selected. If the scroll bar is selected, the routine 1000 continues to block 1030, where the group of page tabs selected by the scroll bar are displayed. Moreover, the scroll bar may be resized depending on the number of document pages. From block 1030, the routine 1000 returns to block 1002. Moreover, if at block 1028, it is determined that the scroll bar has not been selected, the routine 1000 also returns to block 1002.

Based on the foregoing, it should be appreciated that embodiments of the present invention provide a user interface control, a method, and a computer-readable medium for navigating, selecting, and reorganizing document pages. The above specification, examples and data provide a complete description of the manufacture and use of the composition of the invention. Since many embodiments of the invention can be made without departing from the spirit and scope of the invention, the invention resides in the claims hereinafter appended.

We claim:

1. A computer-generated user interface control comprising computer-executable instructions stored on a computer-readable medium for navigating between document pages, the control comprising:

page tabs corresponding to each of said document pages and displayed:
  adjacent to one another in one of: a horizontal column and a vertical column, and
  colorized in an assigned color, wherein the assigned color of each page tab is utilized to display a background portion of each page tab, wherein the assigned color of each page tab is varied to indicate that at least one document page corresponding to each page tab contains at least one search term specified by a user upon searching for the at least one search term specified by the user, and wherein the assigned color of each unselected page tab is colorized in an increasingly darkened gradient corresponding to a distance from a first selected page tab to each unselected page tab;

a corresponding document page displayed in response to a first selection of any page tab as a first currently selected page tab, wherein the first currently selected page tab has at least one adjacent page tab that is identified as a continuation page tab, and wherein the continuation page tab is displayed smaller than a non-continuation page tab, the continuation page tab corresponding to at least one continuation page of a plurality of continuation pages, the at least one continuation page comprising a sequence of notes, the sequence of notes being provided by the user into an insertion point initiated on a first continuation page of the plurality of continuation pages, the sequence of notes ending on a last continuation page of the plurality of continuation pages, wherein the continuation page tab is configured to be selected and moved to a new position between two other non-continuation page tabs, wherein selecting and moving the continuation page tab comprises:
  receiving a second selection to relocate a selected continuation page tab, and
  in response to the received second selection, relocating the selected continuation page tab to the new position, wherein upon receiving the second selection and upon the user inciting relocation, a highlighted outline page tab is displayed and the insertion point is displayed, the insertion point showing the new position for the selected continuation page tab; and a next page tab displayed at an end of one of: the horizontal column of page tabs and the vertical column of the page tabs, the next page tab being operative to:
  cause the at least one adjacent page tab adjacent to the currently selected page tab to become a newly selected page tab, or alternatively to
  navigate one of forward and backward by a preset number of the page tabs, wherein the next page tab being operative to navigate one of forward by the preset number of the page tabs comprises the next page tab being operative to navigate one of forward and backward between groups of the page tabs, wherein the preset number of the page tabs is equivalent to an amount of displayed page tabs in a page tab portion of the user interface control, and display the corresponding document page of the newly selected page tab in a body area of the user interface control.

2. The computer-generated user interface control of claim 1, wherein a first page tab is selected and a second page tab is subsequently selected, and wherein each document page corresponding to the page tabs located between the first page tab and the second page tab is displayed in response to the selection.

3. The computer-generated user interface control of claim 1, wherein the next page tab is displayed only if a total number of the page tabs exceeds a number of page tabs that is simultaneously displayed within a viewable area of an application window.

4. The computer-generated user interface control of claim 3, further comprising:
a new page tab displayed at an end of one of: the horizontal column of the page tabs and the vertical column of the page tabs, the new page tab operative to create a new one of the document pages and to create a new page tab corresponding to the new one of the document pages in response to being selected.

5. The computer-generated user interface control of claim 4, wherein a page number is displayed within the selected page tab.

6. The computer-generated user interface control of claim 5, wherein said page tabs are initially displayed in order from a first created corresponding document page to a most recently created corresponding document page.

7. The computer-generated user interface control of claim 6, wherein the document pages comprise dynamic two-dimensional freeform document pages.

8. The computer-generated user interface control of claim 1, further comprising a scroll bar displayed adjacent to one of: the vertical column of the page tabs and the horizontal column of the page tabs, and wherein the scroll bar is utilized to select a group of page tabs that are displayed within the viewable area of the application window.

9. The computer-generated user interface control of claim 8, wherein a size of the scroll bar varies inversely to the total number of document pages.

10. The computer-generated user interface control of claim 9, further comprising a first display region and a second display region adjacent to the ends of said scroll bar, the first display region identifying a first document page and the second display region identifying a last document page.

11. A method for navigating between document pages, selecting the document pages, and organizing the document pages, the method comprising:
displaying page tabs adjacent to one another in one of: a horizontal column and a vertical column, colorized in an assigned color, and corresponding to each of said document pages, wherein at least one adjacent page tab is identified as a continuation page tab, and wherein the continuation page tab is displayed smaller than a non-continuation page tab, the continuation page tab corresponding to at least one continuation page of a plurality of continuation pages, the at least one continuation page comprising a sequence of notes;
wherein the assigned color of each page tab is utilized to display a background portion of each page tab, the assigned color of each page tab being varied to indicate that at least one document page corresponding to each page tab contains at least one search term specified by a user upon a search for the at least one search term specified by the user;
receiving a first selection of a first page tab;
in response to receiving the first selection of the first page tab, colorizing each unselected page tab in an increasingly darkened gradient corresponding to a distance from the selected first page tab to each unselected page tab;
receiving a second selection of a second page tab subsequent to the first selection of the first page tab, wherein receiving the first selection of the first page tab and receiving the second selection of the second page tab comprises receiving the first selection of the first page tab and receiving the second selection of the second page tab in response to a user initiated input being dragged from the first page tab, across at least one intervening page tab, and subsequently to the second page tab;
scrolling, in response to the user initiated input being dragged from the first page tab, across the at least one intervening page tab, and subsequently to the second page tab, a currently viewable portion of the page tabs to show the second page tab in the currently viewable portion when the second page tab is not in the currently viewable portion prior to the user initiated input being dragged;
displaying, in response to the user initiated input, content of a first document page corresponding to the first page tab, then content of at least one intervening document page corresponding to the at least one intervening page tab, and then content of a second document page corresponding to the second page tab, wherein the content of the first document page corresponding to the first page tab and the content of the at least one intervening document page corresponding to the at least one intervening page tab are each displayed for a period of time;
receiving a third selection of a third page tab to be relocated;
displaying, upon receiving the third selection of the third page tab to be relocated and the user inciting relocation, a highlighted outline page tab and an insertion point, the insertion point showing a new location for the third selected page tab to be relocated;
displaying at least one next page tab at an end of one of: the horizontal column of the page tabs and the vertical column of the page tabs;
receiving a fourth selection of the at least one next page tab, the at least one next page tab being operative to navigate one of forward and backward by a preset number of the page tabs; and
in response to receiving the fourth selection:
selecting, as a newly selected page tab, one of the following: an adjacent page tab adjacent to the currently selected page tab, or alternatively a first subsequent page tab following a group of the page tabs specified by the preset number of the page tabs, wherein the preset number of the page tabs comprises an amount of simultaneously displayed page tabs within the currently viewable portion of the page tabs, and
displaying a corresponding document page of the newly selected page tab.

12. The method of claim 11, further comprising:
displaying the at least one next page tab only if the number of page tabs exceeds the amount of the page tabs that are simultaneously displayed within the currently viewable portion of the page tabs.

13. The method of claim 12, further comprising:
- displaying a new page tab at an end of one of: the horizontal column of the page tabs and the vertical column of the page tabs;
- receiving the fifth selection of the new page tab; and
- in response to the received fifth selection of the new page tab, creating a new one of the document pages and creating a new page tab corresponding to the new one of the document pages.

14. The method of claim 13, further comprising displaying a page number within the selected page tab.

15. The method of claim 14, wherein the document pages comprise dynamic two-dimensional freeform document pages.

16. The method of claim 11, further comprising:
- displaying a scroll bar adjacent to one of: the vertical column of the page tabs and the or horizontal column of the page tabs, the scroll bar having a size that varies inversely to a total number of document pages;
- receiving a drag operation on the scroll bar; and
- in response to the drag operation, selecting a group of page tabs to be displayed within the currently viewable portion of the page tabs.

17. A computer-readable medium comprising computer-executable instructions which, when executed by a computer, cause the computer to perform the method of claim 11.

18. A system for navigating between document pages, the system comprising:
- a memory storage for maintaining a database; and
- a processing unit coupled to the memory storage, wherein the processing unit is operative to:
  - provide page tabs corresponding to each of the document pages displayed adjacent to one another in one of: a horizontal column and a vertical column;
  - display a corresponding document page, in response to a first selection of any page tab as a currently selected page tab, and assign a color to each unselected page tab, wherein each unselected page tab is colorized in an increasingly darkened gradient corresponding to a distance from the first selected page tab to each unselected page tab, and wherein the assigned color of each page tab is utilized to display a background portion of each page tab, the assigned color of each page tab being varied to indicate that at least one document page corresponding to each page tab contains at least one search term specified by a user upon searching for the at least one search term specified by the user;
  - scroll, in response to a user initiated input being dragged from a first page tab, across at least one intervening page tab, and subsequently to a second page tab, a currently viewable portion of the page tabs to show the second page tab in the currently viewable portion when the second page tab is not in the currently viewable portion prior to the user initiated input being dragged;
  - display contents of each of the document pages corresponding to page tabs between the first page tab and the second page tab inclusively when the user initiated input is dragged from the first page tab, across at least one intervening page tab, and subsequently to the second page tab;
  - receive a second selection of one page tab to be relocated, upon receiving the second selection and the user inciting relocation, a highlighted outline page tab is displayed and an insertion point is displayed, the insertion point showing a new location for the selected page tab for relocation, wherein the selected page tab for relocation is not one of the first page tab and second page tab; and
  - display a next page tab at an end of one of: the horizontal column of page tabs and the vertical column of the page tabs, the next page tab operative to:
  - cause an adjacent page tab adjacent to the currently selected page tab, or alternatively to to become a newly selected page tab,
  - navigate one of forward and backward by a preset number of the page tabs, wherein the next page tab being operative to navigate one of forward by the preset number of the page tabs comprises the next page tab being operative to navigate one of forward and backward between groups of the page tabs, each group of the page tabs comprising simultaneously displayed page tabs in the currently viewable portion of the page tabs, and
  - display the corresponding document page of the newly selected page tab in a body area of the user interface control.

19. The method of claim 11, further comprising displaying information when the user initiated input hovers over a one of the page tabs, the displayed information comprising at least one of the following: a page number corresponding to a one of the document pages corresponding to the one of the page tabs, a page title corresponding to the one of the document pages corresponding to the one of the page tabs, and a creation date corresponding to the one of the document pages corresponding to the one of the page tabs.

* * * * *